(12) United States Patent
Crandall et al.

(10) Patent No.: US 8,335,299 B1
(45) Date of Patent: Dec. 18, 2012

(54) SYSTEM AND METHOD FOR CAPTURING, SHARING, ANNOTATING, ARCHIVING, AND REVIEWING PHONE CALLS WITH RELATED COMPUTER VIDEO IN A COMPUTER DOCUMENT FORMAT

(75) Inventors: Justin Crandall, Maricopa, AZ (US); Todd Lindberg, Phoenix, AZ (US); Skip Welch, Phoenix, AZ (US)

(73) Assignee: Computer Telephony Solutions, Inc., Tempe, AZ (US)

( * ) Notice: Subject to any disclaimer, the term of this patent is extended or adjusted under 35 U.S.C. 154(b) by 777 days.

(21) Appl. No.: 12/185,690

(22) Filed: Aug. 4, 2008

Related U.S. Application Data

(60) Provisional application No. 60/953,735, filed on Aug. 3, 2007.

(51) Int. Cl.
*H04M 3/42* (2006.01)
*H04B 5/00* (2006.01)
*G06F 17/00* (2006.01)
*G10L 19/00* (2006.01)

(52) U.S. Cl. ............. 379/85; 340/572.1; 348/14.09; 379/88.25; 379/201.03; 379/202.01; 379/265.07; 379/265.02; 455/41.1; 455/403; 455/411; 455/412.1; 455/558; 704/201; 704/235; 707/705; 709/217; 710/51

(58) Field of Classification Search ............. 348/14.09; 379/85, 88.25, 201, 202.01, 265.02, 265.07, 379/88.13, 88.14, 201.02, 265.05, 201.03; 455/412.1, 558, 41.1, 403, 411; 704/201, 704/235; 707/705; 709/217, 204; 370/311; 340/572.1; 710/51
See application file for complete search history.

(56) References Cited

U.S. PATENT DOCUMENTS

| | | | |
|---|---|---|---|
| 5,790,798 A | 8/1998 | Beckett, II et al. | |
| 6,047,060 A * | 4/2000 | Fedorov et al. | 379/265.02 |
| 6,405,027 B1 * | 6/2002 | Bell | 455/403 |
| 6,665,376 B1 | 12/2003 | Brown | |
| 6,683,940 B2 | 1/2004 | Contractor | |
| 6,792,093 B2 * | 9/2004 | Barak et al. | 379/202.01 |
| 6,940,954 B1 | 9/2005 | Toebes | |
| 6,987,841 B1 | 1/2006 | Byers et al. | |
| 6,988,205 B2 | 1/2006 | Walker et al. | |
| 6,993,120 B2 * | 1/2006 | Brown et al. | 379/88.13 |
| 7,031,439 B2 | 4/2006 | Baxter, Jr. | |
| 7,242,924 B2 * | 7/2007 | Xie | 455/412.1 |
| 7,328,239 B1 * | 2/2008 | Berberian et al. | 709/204 |
| 7,386,114 B1 * | 6/2008 | Robesky | 379/265.05 |
| 7,469,151 B2 * | 12/2008 | Khan et al. | 455/558 |
| 7,471,200 B2 * | 12/2008 | Otranen | 340/572.1 |

(Continued)

*Primary Examiner* — Gerald Gauthier
(74) *Attorney, Agent, or Firm* — Schmeiser, Olsen & Watts LLP

(57) ABSTRACT

The present invention relates to a system and method for capturing, sharing, annotating, archiving, and reviewing phone calls and related computer video output in a computer document format. The system creates a portable, transferable computer file recording of a phone call & computer video ("phone voice recording," or "PVD") that contains attached data to help identify, sort, and archive the file while maintaining the integrity of the file. Another aspect of the invention includes a method of using the system comprising initiating a phone call between two parties; beginning a recording of the call and initiating a PVD for the recording; and terminating the call and creating the PVD for the call. Another aspect of the invention includes a method of accessing a PVD by a user, reviewing and/or modifying the PVD, capturing the modified PVD, and sharing the PVD with another user.

13 Claims, 4 Drawing Sheets

U.S. PATENT DOCUMENTS

| | | | |
|---|---|---|---|
| 7,697,921 B2 * | 4/2010 | Xie | 455/412.1 |
| 7,739,255 B2 * | 6/2010 | Hengel et al. | 707/705 |
| 2001/0016034 A1 | 8/2001 | Singh et al. | |
| 2002/0015480 A1 | 2/2002 | Daswani et al. | |
| 2002/0067805 A1 | 6/2002 | Andrews | |
| 2002/0067810 A1 * | 6/2002 | Barak et al. | 379/88.25 |
| 2002/0118798 A1 * | 8/2002 | Langhart et al. | 379/67.1 |
| 2004/0131161 A1 | 7/2004 | Schwartz et al. | |
| 2004/0207724 A1 * | 10/2004 | Crouch et al. | 348/14.09 |
| 2005/0114116 A1 * | 5/2005 | Fiedler | 704/201 |
| 2005/0129196 A1 | 6/2005 | Creamer et al. | |
| 2005/0141678 A1 | 6/2005 | Anders | |
| 2005/0286708 A1 * | 12/2005 | Slosberg et al. | 379/265.07 |
| 2006/0171511 A1 | 8/2006 | Liu et al. | |
| 2006/0183462 A1 * | 8/2006 | Kolehmainen | 455/411 |
| 2006/0198504 A1 * | 9/2006 | Shemisa et al. | 379/201.02 |
| 2006/0271577 A1 * | 11/2006 | Lin | 707/100 |
| 2006/0277270 A1 * | 12/2006 | Lloyd et al. | 709/217 |
| 2007/0003027 A1 * | 1/2007 | Brandt | 379/88.14 |
| 2007/0054616 A1 * | 3/2007 | Culbert | 455/41.1 |
| 2007/0073929 A1 * | 3/2007 | Takayama et al. | 710/51 |
| 2007/0171850 A1 * | 7/2007 | Feder et al. | 370/311 |
| 2007/0229264 A1 * | 10/2007 | Eveland | 340/572.1 |
| 2008/0104171 A1 * | 5/2008 | Berberian et al. | 709/204 |
| 2008/0207172 A1 * | 8/2008 | Eguchi et al. | 455/411 |
| 2008/0226040 A1 * | 9/2008 | Liu et al. | 379/67.1 |
| 2008/0228479 A1 * | 9/2008 | Prado | 704/235 |
| 2008/0254833 A1 * | 10/2008 | Keevill et al. | 455/558 |
| 2009/0006082 A1 * | 1/2009 | Harris et al. | 704/201 |
| 2009/0097627 A9 * | 4/2009 | Liljestrand et al. | 379/201.03 |

* cited by examiner

SYSTEM AND METHOD FOR CAPTURING, SHARING, ANNOTATING, ARCHIVING, AND REVIEWING PHONE CALLS WITH RELATED COMPUTER VIDEO IN A COMPUTER DOCUMENT FORMAT

CROSS REFERENCE TO RELATED APPLICATION

This application claims priority to U.S. Provisional Patent Application entitled "A SYSTEM AND METHOD FOR CAPTURING, SHARING, ANNOTATING, ARCHIVING, AND REVIEWING PHONE CALLS IN A COMPUTER DOCUMENT FORMAT," Ser. No. 60/953,735, filed Aug. 3, 2007, the disclosure of which is hereby incorporated entirely herein by reference.

BACKGROUND OF THE INVENTION

1. Technical Field

This invention relates generally to a system and method for capturing, sharing, annotating, archiving, and reviewing phone calls in a computer document format and more particularly to a system and method for capturing, sharing, annotating, archiving, and reviewing phone calls in a computer document format that can be modified while maintaining the integrity of the original contents of the document.

2. State of the Art

There are many instances where credit card companies, insurance companies, private individuals, or other entities desire to record a phone call. For example, the ability to record a phone call may be desired to verify information conveyed during a phone conversation or to provide evidence in the event of a dispute over the substance of a phone conversation. However, an entity that desires to record a phone call faces several challenges.

The phone call recording may not provide sufficient data to identify the phone call and its parties. Without sufficient data to identify the phone call and its parties, it is difficult for an entity to use the phone call recording as evidence in a dispute between the parties. Some methods of recording phone calls only record the information that is verbally communicated between the parties during the call. If the parties do not verbally communicate enough data during the call to sufficiently identify the phone call and its parties, the recording will not be useful to the parties as evidence in a dispute between the parties.

Entities that record a large number of phone calls may have difficulty archiving the recorded calls in a simple, organized manner. If the recorded phone calls are not archived in a simple, organized manner, the entity may have difficulty retrieving a specific recording or set of recordings pertinent to a specific party or issue. This can be especially detrimental to an entity trying to retrieve a phone call recording pertinent to a dispute with another party.

If the phone call recording is needed in a dispute between two parties, its integrity must be maintained. For example, a court may not allow a phone call recording as evidence if there are not sufficient security measures in place to maintain the integrity of the recording. Thus, the recording process may need to be performed by third parties or performed with security features that prevent tampering of the recordings.

Recording a phone call in a standard computer audio file format such as .wav has allowed large numbers of phone call recordings to be archived and retrieved within a computer data system. This has provided archiving and retrieval benefits inherent to any computer data system. However, a phone call recording in a computer audio file format still may not readily identify the phone call and its parties, if the recording only contains the verbal communications between the parties. Additionally, the organization of a large number of phone call files recorded in a standard computer audio format has been limited to sorting by filename. Methods of attaching automated call data pertinent to the phone call, such as the parties' phone numbers, the time and date of the call, hold times, etc. to the computer audio file have been used to provide additional information to help identify the parties and the phone call in a future dispute between the parties. Attaching automated call data to the files has also provided additional options for sorting and organizing a large number of phone call recording files and thus has made retrieving a specific call or set of calls easier.

However, prior methods of attaching automated call data to a recorded phone call computer file are limited by the automated data collected and attached to the file. The party recording the conversation may desire additional user-defined call data to be annotated and attached to a phone call file during a call or post call, while maintaining the integrity of the phone call. This will allow the party to be able to review and share the phone calls in an easily transferable method, and will provide additional options for archiving and retrieving the files. Accordingly, there is a need in the field of telecommunication and informational technology for an improved method for capturing, sharing, annotating, archiving, and reviewing phone calls.

DISCLOSURE OF THE INVENTION

The present invention relates to a system and method for capturing, sharing, annotating, archiving, and reviewing phone calls and optionally related computer video output in a computer document format. The system creates a portable, transferable computer file recording of a phone call and optionally related computer video output that contains attached data to help identify, sort, and archive the file while maintaining the integrity of the file.

An aspect of the invention includes a system for recording a phone call and optionally related computer video output, the system comprising equipment to make a phone call between at least two parties; equipment to record the phone call; a file in a computer document format to archive the recording; and a user interface to access, review and modify the file.

Another aspect of the invention includes a portable voice document ("PVD") file for recording phone calls and optionally computer video output in a computer document format that contains an audio recording of the transcript of the phone call; a video recording of the internal phone call party's computer output; a header in a standard computer audio player format; automated call data; user-defined call data; and integrity information.

Another aspect of the invention includes a method of using the system comprising initiating a phone call between two parties; beginning a recording of the call and initiating a computer file for the recording; resolving which computer is associated with the internal phone call party; initiating capture of the computer video output of the internal party's computer; and terminating the call and creating the computer file for the call. The method may further include recording additional parties who enter the call after the recording has been initiated.

Another aspect of the invention includes a method of accessing a PVD by a user, reviewing and/or modifying the PVD as the call is in progress or after the call ends, capturing the modified PVD, and sharing the PVD with another user.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a system and method for capturing, sharing, annotating, archiving, and reviewing phone calls and optionally computer video output in a computer document format. The system creates a portable, transferable computer file recording of a phone call and related computer video that contains both automated call data and user-defined data attached to the file to help identify, sort, and archive the file. This will allow the recording party to increase its organizing and sorting capabilities beyond those achieved by attaching only automated call data. For example, an entity that records its phone calls may want to attach a priority to its recorded call files based on the likelihood of making a sale, receiving a future customer complaint, or collecting a debt from the party that was called, and may want to later sort and retrieve particular recorded calls based on that priority. However, allowing a party to add user-defined call data to a phone call recorded in a computer audio file presents specific challenges in maintaining the integrity of the portion of the file that includes the phone conversation audio and the automated call data recorded during the phone call. If the phone call file is to be used to settle a dispute between two parties, the addition of user-defined call data to the file must be performed with a level of security such that the integrity of both the phone conversation and the automated call data is not compromised.

Figure 1:
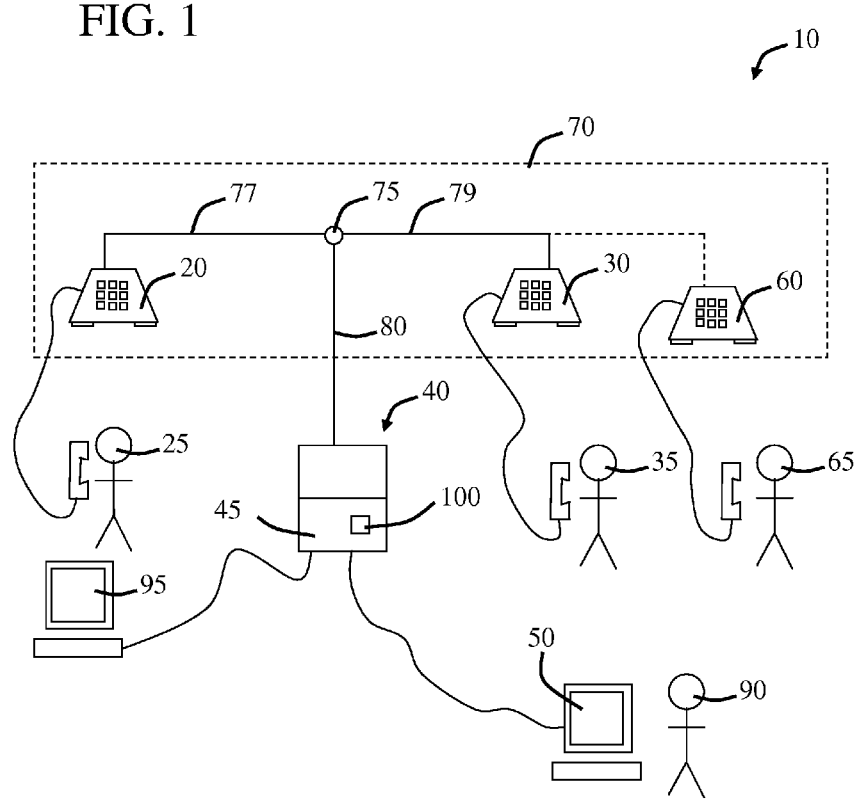
FIG. 1 is a schematic of a system illustrating one embodiment of the present invention.

Referring to the drawings, FIG. 1 depicts a particular embodiment of a system 10 to record a phone call between at least two parties. Communication system 70 includes a system and equipment necessary to initiate a phone call between parties. For example, communication system 70 may include a landline or cellular phone, and a switched telecommunication network for transmitting the phone call. In this embodiment, recording party 25 uses phone 20 to place or receive a phone call with or from party 35 using phone 30. Phones 20 and 30 are in communication with each other through phone lines 77 and 79 using a switching system 75. It is understood by those having knowledge in the art that phone lines 77 and 79 may be airwaves, particularly if phones 20 and 30 are cellular phones.

Communication system 70 includes a recorder line 80. Recorder line 80 is in communication with phone lines 77 and 79 using switching system 75. By being in communication with phone lines 77 and 79, recorder line 80 can receive the communication transmitted through phone lines 77 and 79. Recorder line 80 is connected to recorder 40. By connecting recorder 40 with phone lines 77 and 79 through switching system 75 and recording line 80, recorder 40 can record the communication transmitted between parties 25 and 35. The communication between parties 25 and 35 is recorded while the communication between parties 25 and 35 is transmitted via phones 20 and 30 using phone lines 77 and 79. It should be noted that if additional parties enter the communication, such as in a 3-Way call or teleconference, recorder 40 will record all parties. An example of a third party 65 entering the communication using phone 60 is shown in FIG. 1. In addition to the audio conversation of the phone call, the computer video screen 95 activity for party 25, can also be recorded.

Recorder 40 can be of many types. In this particular embodiment, recorder 40 is a computer system capable of receiving a communication from recorder line 80 as well as the computer video screen activity for party 25 and capturing it on the computer system memory 45 as a phone recording file 100, discussed in more detail below. Recorder 40 may continuously record all phone communications by recording party 25 or its use may be selectively controlled through switching system 75 or through a switch (not shown) at recorder 40. Recorder 40 may be controlled remotely and may also be controlled by a third party. The flexibility of recorder control makes it useful in various business settings to allow its use to be for legitimate business purposes, lawful and efficient. For example, a business may choose to only initiate phone call recording for sales confirmation phone calls and only once the internal phone party has selected for the call to be recorded indicating that the outside party has given consent.

Figure 2:
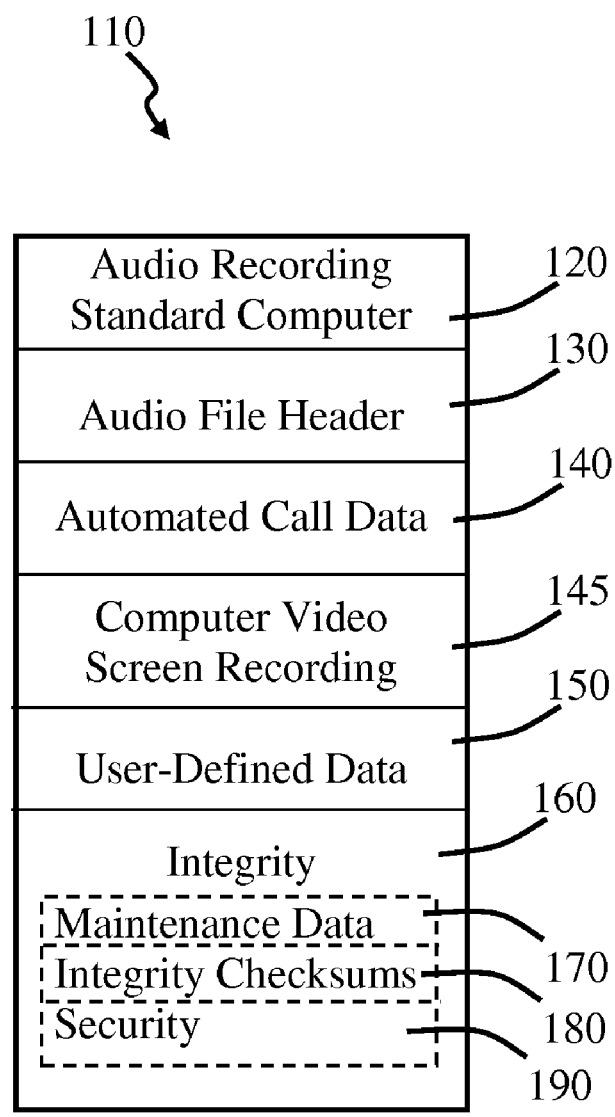
FIG. 2 is a diagram of one embodiment of a computer document format, in accordance with the present invention.

Phone recording file 100 may be of many types. In some embodiments, phone recording file 100 is a standard computer audio file such as .wav. In this embodiment, phone recording file 100 is a portable voice document 110 ("PVD"), as shown in FIG. 2. PVD 110 includes a phone audio recording 120 of the phone call between parties 25 and 35. PVD 110 also includes an audio file header 130. The PVD can also contain video screen data 145 of the user computer screens who were involved in the call. PVD 110 also includes automated call data 140. Automated call data 140 includes non-verbal information that is automatically recorded by recorder 40 pertinent to the phone call between parties 25 and 35. It should be noted that automated call data 140 may include information for additional parties entering the communication, such as party 65, as discussed above. Automated call data 140 may include many types of information, such as the phone numbers of parties 25 and 35, the date and time of the phone call, the hold times of the parties, etc. Attaching automated call data 140 to PVD 110 during a phone call is useful because it will help identify the parties and the phone call in a future dispute between the parties. Attaching automated call data 140 to PVD 110 is also useful because it will provide additional options for sorting and organizing a large number of PVD 110 files, such as sorting by a party's phone number. For example, a primary use of this invention is to retrieve and playback a recording of a phone call at some point in time after the conclusion of the original call. In many cases the person seeking the recording will not recall the precise time and date of the original call and will desire to search based on information such as outside party name, outside party caller ID, business-specific reason code, etc., all of which may be generated by switching system 75. The inclusion of this data in PVD 110 files makes them intrinsically searchable, thus more easily usable. A business can segment user access to PVD 110 using this non-verbal information. For example, a business may allow only an executive manager access to certain phone call recordings based on the nature of calls occurring on a specific set of business telephone lines. Additionally, this feature of the invention means that automated call data 140 is part of PVD 110 as opposed to data stored only in a separate system such as a relational database. This eliminates a point of failure from the system that could otherwise detrimentally affect a business's ability to secure access to phone call recordings and users' ability to search for, find and playback a necessary phone call recording. PVD 110 may also include user-defined data 150. User-defined data 150 includes information that is added manually to PVD 110. User-defined data 150 may include many types of information, such as comments, bookmarks, annotations, categorizing, highlighting, and prioritizing. User-defined data 150 may be added to PVD 110 in many ways. In this embodiment, user-defined data 150 is added to PVD 110 by a user 90 at a user interface 50. See FIG. 1. User 90 may be many different entities, such as parties 25, 35, and/or 65. User interface 50 is in communication with recorder memory 45 to access PVD 110. User interface 50 may be of many types, such as a handheld personal assistant. In this embodiment, user interface 50 is a personal computer system. In some embodiments, user interface 50 is the same computer system as used by recorder 40. User-defined data 150 is useful because it allows user 90 to add information to PVD 110. Adding information to PVD 110 is useful because it will provide additional options for sorting and reviewing PVD 110. For example, recording party 25 may want to add a note related to the subject of the call into PVD 110. This user-entered text information becomes part of PVD 110 and can be used to search for the phone recording at a later time. User-defined data 150 can also be used by the business to grant user access to PVD 110. This is useful to automatically grant access to a phone call recording related to a given project to all members of the project team, eliminating manual steps otherwise required to search for and share the computer file with team members. PVD 110 may also include integrity data 160. Integrity data 160 may include many things. In this embodiment, integrity data 160 includes maintenance data 170 and integrity checksums 180. Integrity data 160 may also include security 190. Security 190 may control access to PVD 110 and/or user-defined data 150. Security 190 may also prevent any access to audio recording 120. Integrity data 160 is useful because it prevents and/or limits access to PVD 110 and/or user-defined data 150. Integrity data 160 also prevents manipulation of the audio recording 120, which is useful if PVD 110 is used to settle a dispute between parties 25 and 35. A primary use of capturing a phone call recording in a computer document format is to resolve disputes, sometimes involving litigation, between parties. Integrity data 160 enhances PVD 110's usefulness in litigation as it assures all parties that the phone call recording is a perfectly accurate representation of the original telephone call.

Figure 3:
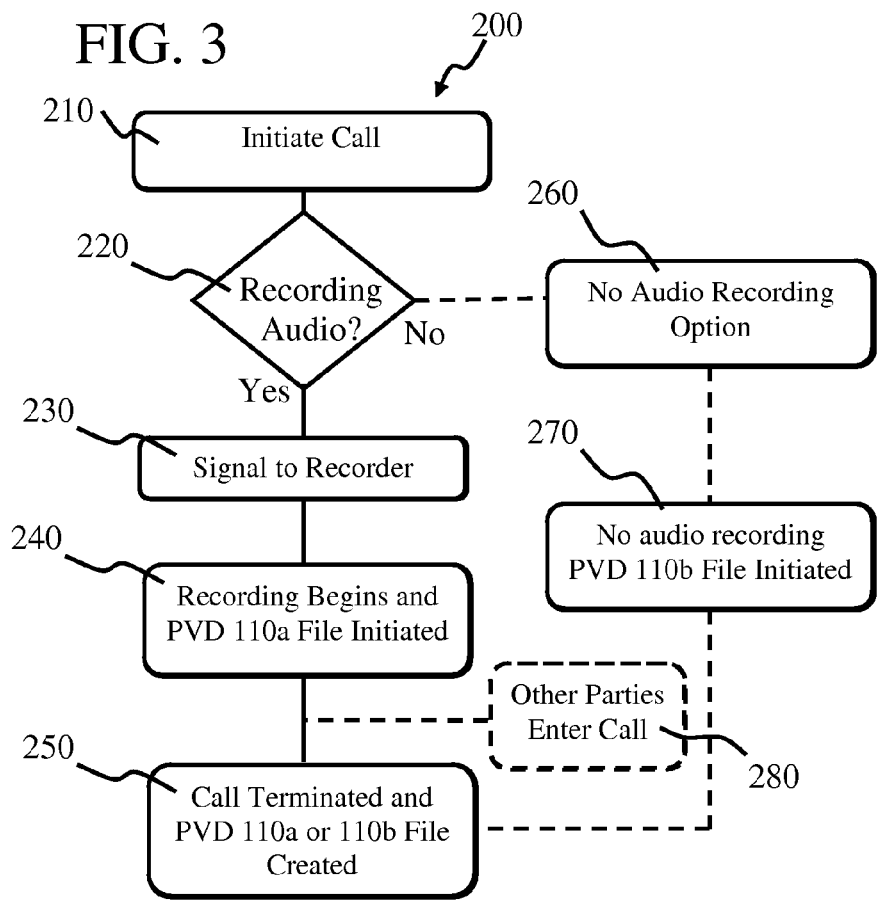
FIG. 3 is a flow chart of a method of use of a system of capturing phone calls in a computer document format, in accordance with embodiments of the present invention.

FIG. 3. shows a particular embodiment of a method 200 for capturing the PVD 110. In step 210, a connection is made between recording party 25 and party 35. At step 220, one of the recording parties or recorder 40 determines whether a phone audio recording 120 will be included in the PVD 110. If a phone audio recording 120 will be included, recorder 40 will initiate a PVD 110*a* and begin recording as shown by step 240. PVD 110*a* will include phone audio recording 120, possibly computer video screen recording 145, and automated call data 140. At step 250, the call is terminated and PVD 110*a* is captured to memory 45. If a recording party determines in step 220 that audio recording 120 will not be included in the PVD 110, recorder 40 will initiate a PVD 110*b* file that has no audio recording 120, as shown by step 270. In some embodiments, the PVD 110*b* file initiated in step 270 may include automated call data 140. In some embodiments, the automated call data 140 for PVD 110*b* may only include a log indicating the refusal to record phone audio recording 120. At step 250, the call is terminated and the PVD 110*b* is captured to memory 45. It should be noted that the recording of PVD 110*a* or 110*b* is dynamic. For example, if additional parties were to join the communication between steps 240 and 250 as shown by optional step 280, or between steps 260 and 270 (not shown), the PVD 110*a* or 110*b* will be updated dynamically to include the new parties' phone audio recording 120 and/or automated call data 140. This aspect of the invention is useful for businesses that experience phone calls part or all of which are not appropriate for phone call recording. Some or all of any phone call can be recorded to provide documentation of the call for legitimate business uses while the remainder of the phone call audio is disregarded. In such cases it is possible that information related to the entire phone call, including the reason for audio recording termination, be retained for uses such as systems auditing. Due to certain States within the United States of America having adopted more restrictive codes related to phone call recording than the Federal code this feature can be quite useful in ensuring lawful use of the invention.

Figure 4:
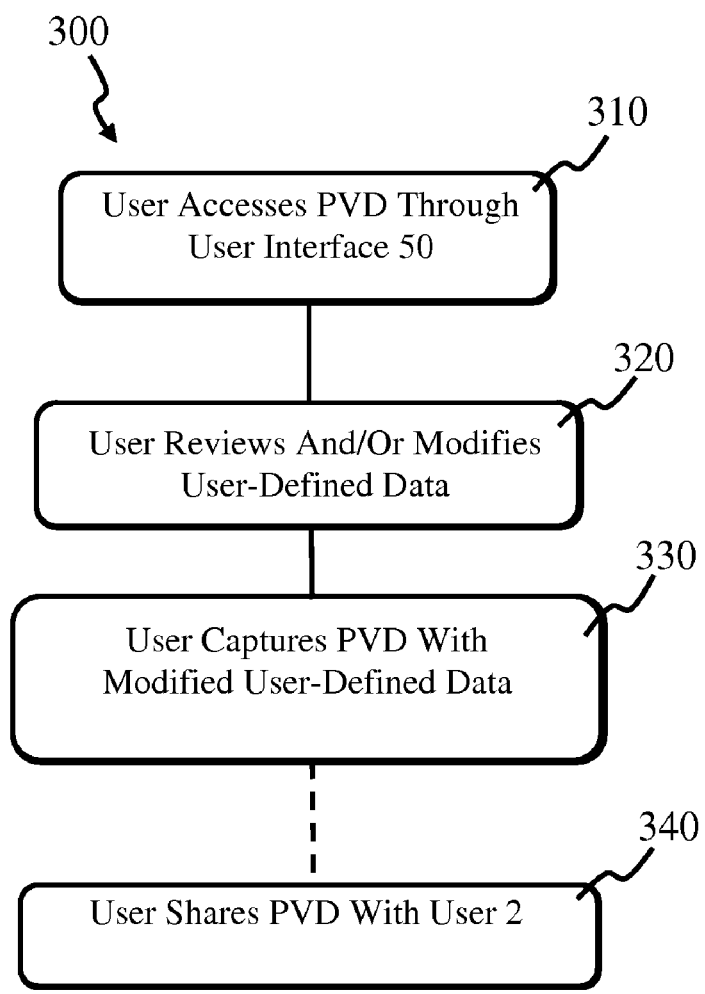
FIG. 4 is a flow chart of a method of use of a system of accessing and sharing phone calls in a computer document format, in accordance with another embodiment of the present invention.

FIG. 4. shows a particular embodiment of a method 300 for accessing, reviewing, and modifying the user-defined data 150 of PVD 110. In step 310, user 90 accesses PVD 110 with user interface 50 as shown in FIG. 1 and discussed above. PVD 110 may have been communicated to user interface 50 from recorder memory 45 as discussed above, or communicated from another user, such as by email (not shown). In step 320, user 90 reviews and/or modifies the user-defined data 150 of PVD 110. For example, user 90 may highlight, add comments, and/or categorize a specific portion of phone audio recording 120 of PVD 110 for another user to review. In some embodiments, user 90 may review the phone audio recording 120 and the computer video screen recording 145, and/or the automated call data 140, and/or the user-defined data 150 through user interface 50. In step 330, user 90 captures PVD 110 with any modifications made to the file. These modifications do not change the audio recording 120, and are captured in PVD 110 through a modified user-defined data 150. In optional step 340, user 90 may share or communicate the modified PVD 110 to other users. For example, recording party 25 may choose to add text-based instructions as comments to a specific portion of PVD 110 as defined by a portion of the audio represented between points A and B in time relative to the start of the phone call recording. Once these instructions have been added, recording party 25 may now wish to share the annotated portion of recording audio and the associated text-based comments with some other party to efficiently and accurately transfer the information contained within that portion of PVD 110. This is useful in reducing miscommunication and increasing the efficiency of recording party 25.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A system for recording a phone call and related computer video output, the system comprising:
   equipment to make a phone call between at least two parties;
   equipment to record the phone call;
   a file in a computer document format to archive the recording; and
   a user interface to access review and modify the file with user-defined call data comprising comments, annotations, categorizing, highlighting, prioritizing and combinations thereof.

2. The system of claim 1, wherein the equipment to make a phone call comprises phone lines, including a landline or airwaves and a switched telecommunication network transmitting the phone call.

3. The system of claim 2, wherein equipment to make a phone call includes at least two phones in communication with each other through phone lines using a switching system.

4. The system of claim 3, wherein the equipment to record the phone call includes a recorder line in communication with the phone lines using the switching system.

5. The system of claim 4, further comprising a recorder connected to the recorder line.

6. The system of claim 5, wherein the recorder is adapted to record audio conversation and video screen activity of a computer.

7. The system of claim 1, wherein the file in a computer document format comprises a portable voice document having a phone audio recording, an audio file header and video screen data from a user computer screen.

8. A method of using a system for recording a phone call and related computer video output, the method comprising:
   initiating a computer file for the recording;
   beginning a recording of a call and initiating a computer file for the recording;
   resolving which computer is associated with an internal phone call party;
   initiating capture of computer video output of the internal party's computer;
   terminating the call and creating the computer file for the call; and
   accessing a computer file by a user for reviewing and modifying the computer file of the recording as the call is in progress or after the call is terminated.

9. The method of claim 8, wherein initiating a computer file further comprises initiating automated phone call data.

10. The method of claim 9, wherein the automated phone call data includes a log indicating a refusal to record phone audio.

11. The method of claim 8, wherein the recording of the call is dynamic to account for additional parties joining a call.

12. The method of claim 11, further comprising updating the computer file of the recording dynamically.

13. The method of claim 8, further comprising capturing the modified computer file of the recording and sharing the computer file with another user.

* * * * *